United States Patent

Passage et al.

Patent Number: 5,252,074
Date of Patent: Oct. 12, 1993

[54] MAGNETIC THREE-DIMENSIONAL ANALYSIS SYSTEM FOR HAIRDRESSING EDUCATION

[75] Inventors: Leo Passage, Evanston; Robert Passage, Algonquin, both of Ill.

[73] Assignee: Pivot Point International, Inc., Chicago, Ill.

[21] Appl. No.: 782,522

[22] Filed: Oct. 25, 1991

[51] Int. Cl.$^5$ ............................................. G09B 19/10
[52] U.S. Cl. ..................................................... 434/94
[58] Field of Search ................. 434/94, 371, 377, 433, 434/270, 155; 132/213, 214

[56] References Cited

U.S. PATENT DOCUMENTS

| | | | |
|---|---|---|---|
| 2,558,516 | 6/1951 | Granberg | 132/213 |
| 2,670,570 | 3/1954 | Gnaizda | 446/394 |
| 2,919,702 | 1/1960 | Olivo | 132/200 |
| 2,936,767 | 5/1960 | McDonough | 132/214 |
| 2,941,314 | 6/1960 | Schwieger | 434/73 |
| 2,968,104 | 1/1961 | Ito | 434/94 |
| 2,975,534 | 3/1961 | Lutz | 434/94 |
| 3,001,530 | 9/1961 | Julian | 132/226 |
| 3,101,557 | 8/1963 | Watlington et al. | 434/94 |
| 3,325,917 | 6/1967 | Kinnaman | 434/94 |
| 3,339,297 | 9/1967 | Stinn et al. | 434/190 |
| 3,458,943 | 8/1969 | Trowbridge | 434/94 |
| 4,051,607 | 10/1977 | Sullivan | 434/287 |
| 4,224,745 | 9/1980 | Hubbard | 434/94 |
| 4,317,462 | 3/1982 | Steiner | 434/213 |
| 4,370,137 | 1/1983 | Herzig et al. | 434/94 |
| 4,403,962 | 9/1983 | La Vista | 434/94 |
| 4,669,985 | 6/1987 | Hvalsbraten | 434/94 |
| 4,810,196 | 3/1989 | Walker | 434/94 |

FOREIGN PATENT DOCUMENTS 2634042  1/1990  France .................. 434/94

Primary Examiner—John J. Wilson
Assistant Examiner—Jeffrey A. Smith
Attorney, Agent, or Firm—Robert E. Browne; Thomas C. McDonough; Mark A. Galis

[57] ABSTRACT

A magnetic three-dimensional analysis system for use as a tool in the demonstration of hairdressing techniques by an instructor and to aid a student in learning and practicing such techniques. In one form, the system includes four magnetic grid head forms: a left profile grid head form, a right profile grid head form, a front section grid head form, and back section grid head form. The grid head forms have flat backs which are magnetized so they can be attached to a magnetic blackboard or metal sheet. The system also includes numerous flat magnetic or adhesive strips with pointed ends. The strips are cut to certain lengths and color coded to represent different hairdressing techniques. In a preferred embodiment, a grid head form is attached to a magnetic board and the flat magnetic strips are then attached to the board around the grid head form to both define cutting lines and show proper hair length for a plurality of prescribed hair styles. In a second form, unitary three-dimensional head having magnetized portions is used in conjunction with a series of colored strips having at least magnetized ends which may be connected on the magnetized portions of the head.

11 Claims, 4 Drawing Sheets

MAGNETIC THREE-DIMENSIONAL ANALYSIS SYSTEM FOR HAIRDRESSING EDUCATION

FIELD OF INVENTION

The present invention relates to a system for teaching various hairstyling techniques, and more particularly to a magnetic three-dimensional analysis system to be used as a tool in the demonstration of hairdressing techniques by an instructor and to aid students in learning and practicing such techniques.

BACKGROUND OF THE INVENTION

In the cosmetology profession significant problems have arisen with respect to effective demonstration and practicing techniques.

It is common for instructors to use photographs and two-dimensional charts, as well as written descriptions, to guide the student in learning various hairstyling techniques. These two-dimensional aids are limited in their effectiveness because they require visualization and much trial and error on the part of the student. While trial and error is one approach to such training, such an approach can leave the student feeling inadequate and unable to perform.

It is clear that a three-dimensional teaching aid would be more effective. A step in this direction was made in U.S. Pat. No. 2,975,534 to Lutz which disclosed an inflatable balloon-like device which can be blown up and attached to a base. However, this device does not allow actual manipulation of the hair but only provides reference patterns.

A further step in this direction was made by Trowbridge in U.S. Pat. No. 3,458,943 which teaches a model head covered with Velcro ® material over the areas normally covered by hair. Swatches of wig material are provided that can be worked on a particular area of the head. This device is some help in defining specific areas of the head, but no guides for direction, rolling, combing or cutting are indicated.

One more step in this direction was made by LaVista in U.S. Pat. No. 4,403,962 which discloses a mannequin head form with markings and indicia on the scalp portion thereof, having hair attached thereto to provide a three dimensional instructional device for use by hairstyling instructors and students.

These various three-dimensional models, while being superior teaching devices to the two-dimensional aids, do not provide the student any guidelines for styling other than the indicia on the mannequin head form. In addition, they are limited in their use to work with swatches or portions of hair and do not allow instructors to easily and quickly introduce and explain alternative techniques of styling.

SUMMARY OF THE INVENTION

The present invention overcomes the above-described problems by providing a real, three-dimensional visual training aid which gives instructors an easy and dramatic way to teach students the structure or length arrangement of a hair cut. It is a revolutionary approach to cosmetology training. The magnetic three-dimensional analysis system, according to a preferred embodiment, includes four different mannequin head forms covered with a grid used as a measuring tool: a left profile grid head form, a right profile grid head form, a front section grid head form and a back section grid head form. Each grid head form has a flat back to which a flexible flat magnet is attached with acrylic adhesive.

The system also includes eighty-eight magnetic strips with pointed ends. The strips are cut in various lengths and color coded to correspond to different basic hair length structure techniques. There are twenty-two strips in each of four colors.

In the preferred embodiment, a grid head form is attached to a white magnetic board or metal sheet. Selected magnetic strips with the pointed ends are then attached to the board around various grid head forms as desired by the instructor. The placement of these strips corresponds to the hairstyling technique being taught.

In another embodiment, an entire full head form covered by a measuring grid is magnetized. This may be done by attaching magnetic strips in spaced arrangement about the head form to be used as a base to which colored projection strips can be attached. Magnetic pieces are attached to the ends of these projection strips. The colored projection strips, which can be cut to any length the instructor wishes are then attached to the grid head form as desired to show various hair length structures. This embodiment provides a complete three-dimensional view of the human head on which the instructor can demonstrate and the student can work.

In each embodiment, the head, made of soft polyvinylchloride (PVC) material can have hair wefts or sections pinned to it so students can also practice on actual hair pieces.

BRIEF DESCRIPTION OF THE DRAWINGS

In the drawings:

FIG. 2 Side A is a side view showing the colored magnetic strips with pointed ends being used with a left profile magnetic grid head form.

FIG. 2 Side B is a front view showing the colored magnetic strips with pointed ends being used with a front section magnetic grid head form.

DETAILED DESCRIPTION OF THE INVENTION

Figure 1:
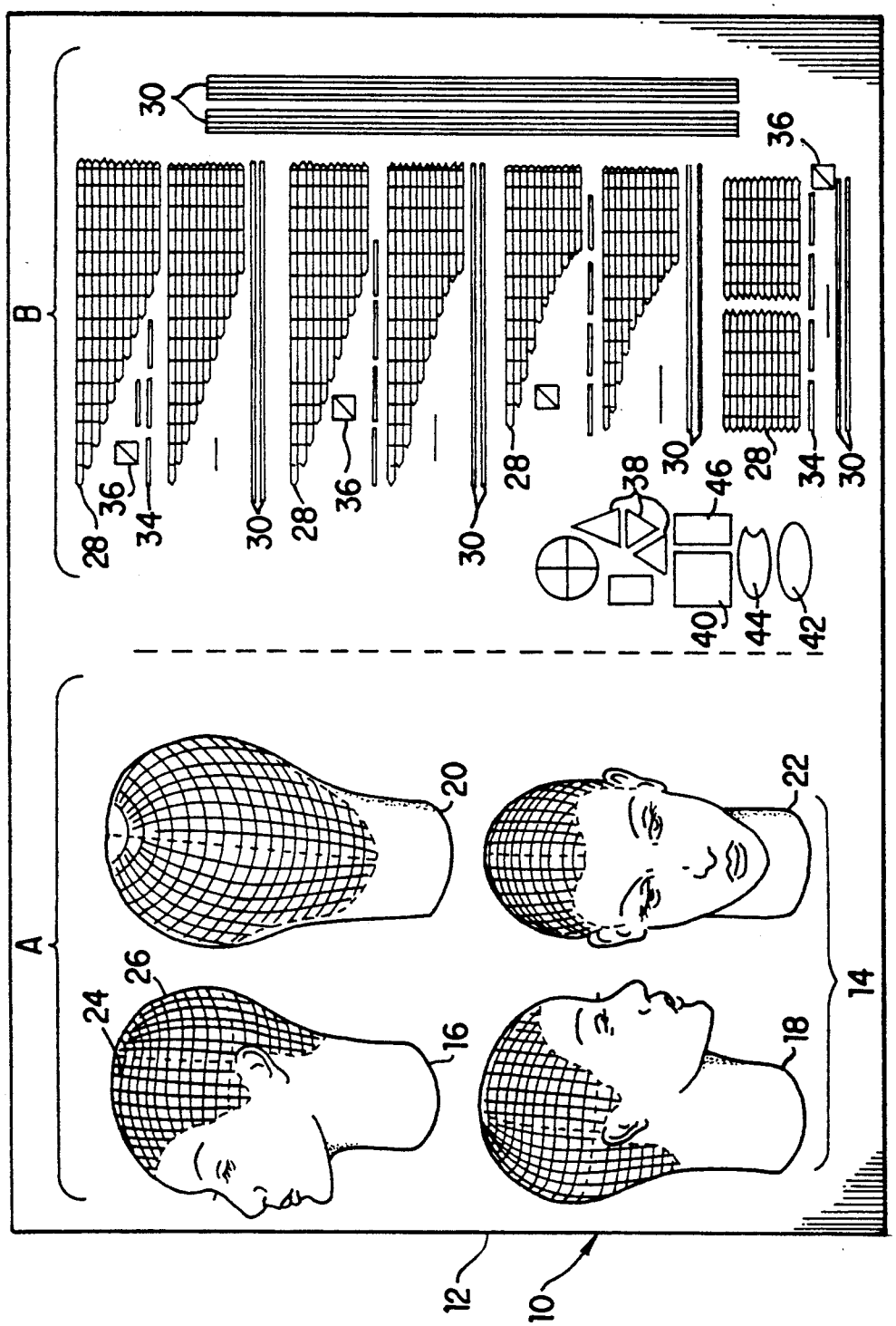
FIG. 1 is a view of all the components of a first embodiment of the magnetic three-dimensional analysis system.

Referring to FIG. 1, a view of all the components of the magnetic system 10 of a preferred embodiment of the invention is shown. These are shown as mounted on a metal or magnetic white board 12. Side A shows four magnetic head forms 14 including: a left profile head form 16, a right profile head form 18, a back section head form 20, and a front section head form 22. The head forms 14 may be formed from soft plastic such as PVC or similar material having a wall thickness sufficient to provide a rigid form suitable for use by students in learning various hairstyling techniques. Each magnetic head form 14 has a flat back to which a conventional flexible flat magnet (not shown) is attached with acrylic adhesive.

The hair area on each head form 14 is covered with a grid 24, with each square 26 measuring one centimeter by one centimeter. The grid 24 is used as a measuring tool for designers to determine length of hair weight areas as well as the structural components of a design. Each square 26 can include additional marking which indicate certain methods and directions of handling the hair strands in such areas.

Side B of FIG. 1, shows the other components of this system 10. This includes eighty-eight magnetic strips 28 with pointed ends. Each magnetic strip 28 is one quarter inch in width. These strips 28 are cut to certain lengths and color coded to represent the four basic hair length structures. For example, blue represents a solid structure having a length progression that increases toward the top of the head. These lengths fall to one level, as in a bob design. Yellow represents a graduated structure which also progresses in length toward the top of the head but in which the ends stack up on one another. Red represents an increase layered structure which has a length progression that increases toward the perimeter. The ends disperse over the curve of the head. Green represents a uniformly layered structure which has a repetition of lengths throughout. There are twenty-two strips 28 of each color. Each strip 28 is marked with a number from one to eleven, with two of the same number in each color. Strips 28 with the same number, in the same color, are the same length.

Side B of FIG. 1 also shows sixteen thin magnetic strips 30. These sixteen thin magnetic strips 30 are one-eighth of an inch in width. Each of these sixteen thin strips 30 is flexible. Eight of these flexible strips 30 are black and the other eight coordinate with the coded hair structure colors. The flexible strips 30 are used to show the form line, as well as the natural fall line, as shown in FIG. 2B. These flexible strips 30 can also be used whenever a curved line is needed.

Side B also contains four arrows 34 and two equilateral triangles 36 in each color. The triangles 36 measure approximately seven-eighths of an inch by seven-eighths of an inch by seven-eighths of an inch. Other system 10 components shown in FIG. 1 include three triangles 38, two equilateral and one isosceles, a square 40, an oval 42, an oblong 44 and a rectangle 46.

Figure 2:
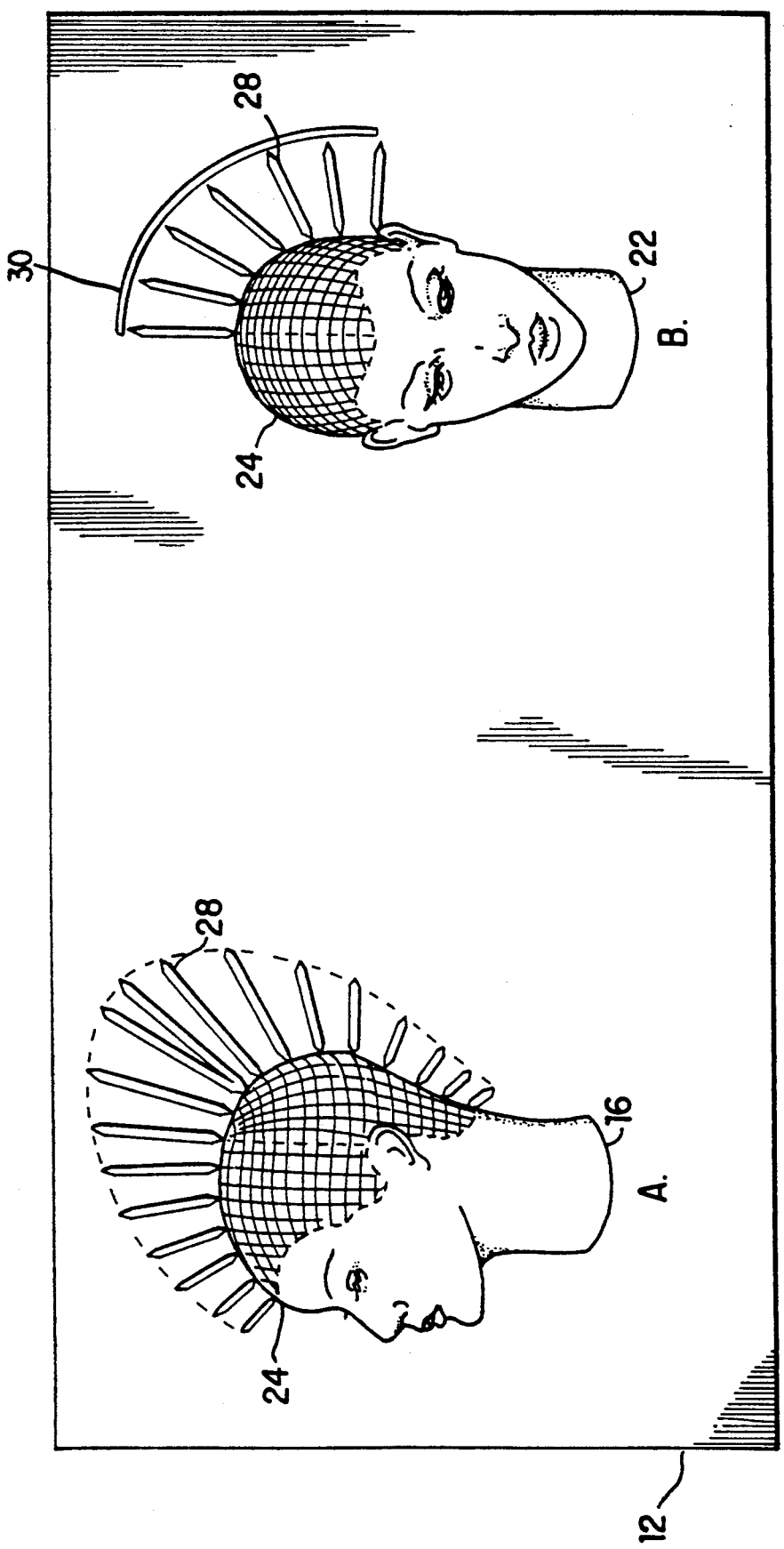
FIG. 2 is a view of the magnetic strips with pointed ends being used with two different magnetic grid head forms.

In the preferred embodiment, a magnetic grid head form 14 such as the left profile 16 and front section 22 are attached to a magnetic white board or metal sheet 12 as in FIG. 1 and 2. The numbered strips with the pointed ends 28 are then attached to the magnetic board 12 around the grid head form 14 as illustrated. The placement of the strips 28 indicates the hairstyling technique which is being taught and explicitly shows students the length and type of hair structure. Instructors can position these strips 28 quickly, easily and accurately around the curve of the head.

Figure 3:
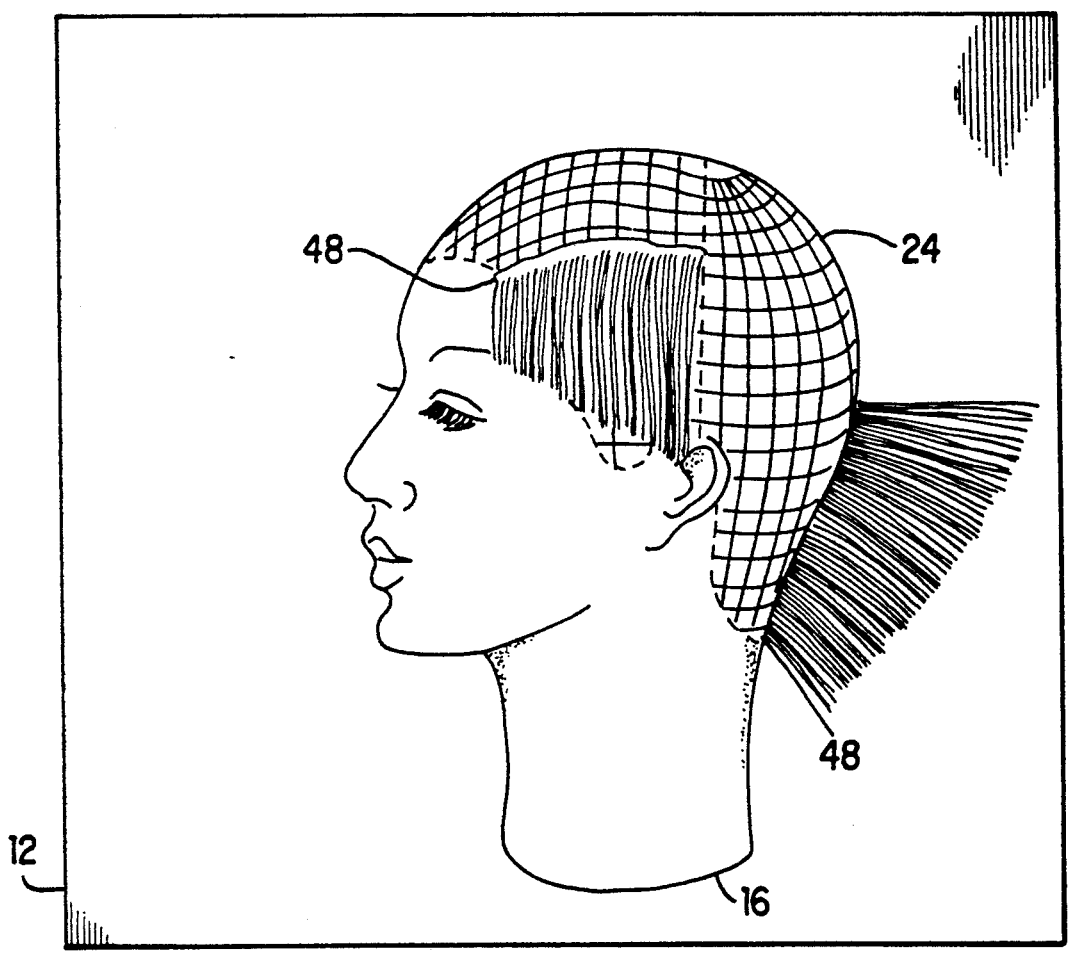
FIG. 3 is a side view of a magnetic grid head form with a hair weft attached and magnetic strips attached to the hair weft.

FIG. 3 shows a side view of a magnetic grid head form 14 with a hair weft 48 attached. The hair weft 48 may be attached to the soft head form 14 by means of pins or the like. Again the head form 14 is magnetically attached to the board 12 providing a conspicuous and easy means for instruction.

Figure 4:
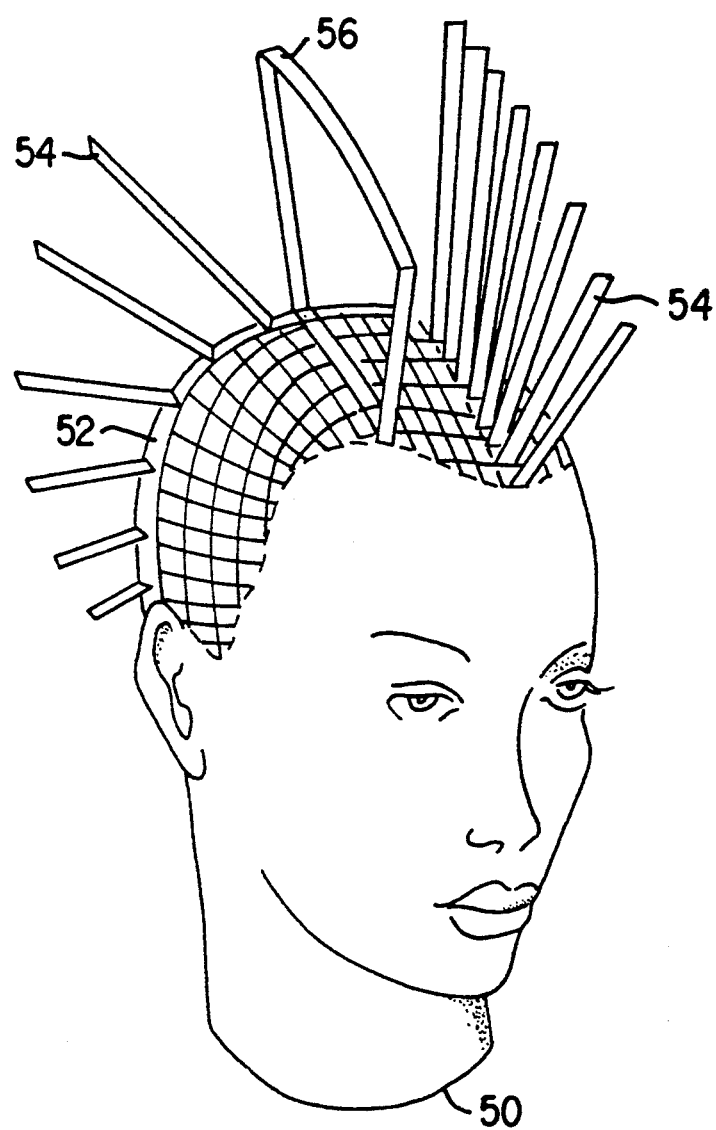
FIG. 4 is a view of a further embodiment of the three-dimensional analysis system using a full grid head form with projection strips attached.

In another embodiment shown in FIG. 4 an entire full head form 50 rather than quadrants is used. This head form 50 has magnetic strips 52 over its surface to be used as a base to which projection strips 54—functioning the same as magnetic strips 52—can be attached above. Magnetic pieces are attached to the bottom of these projection strips 54. These magnetic pieces may be magnetically mounted on the magnetic strips 52 on the grid head form 50. These projection strips 54 are also color coded to the hair structure colors. The projection strips 54 can be cut to any length the hair designer or instructor wishes to use. The form line projection strip 56—seen in FIG. 4 indicates an entire form line. The form line projection strip 56 attaches to the grid head form 56 in the same way on the other projection strips 54, except that magnets are attached to both ends. Both ends attach to the grid head form 50. When viewed from any angle this system provides a complete three-dimensional view of a structure, including sides, top and nape.

I claim:

1. Three-dimensional magnetic partial head form means for use as a tool in the demonstration of hairdressing techniques by an instructor and to aid cosmetology students in learning and practicing such techniques, said three-dimensional magnetic partial head form means comprising:
   a. a three dimensional magnetic head form representing a view of half of a human head, said head form having at least one flat surface parallel to the longitudinal axis of said head form, said flat surface having a flat magnetic means attached for the purpose of attaching said partial head form means to a magnetically attractive flat surface;
   b. a plurality of markings on said magnetic head form for indication of a hairstyling technique, said markings forming a grid to aid the student in practicing hairdressing.

2. Three-dimensional magnetic partial head form means as defined in claim 1 having magnetic strips attachable to said partial head form means and said magnetically attractive flat surface.

3. Three-dimensional magnetic partial head form means as defined in claim 2 in which said magnetic strips are color coded to illustrate a particular hair structure.

4. Three-dimensional magnetic partial head form means defined as in claim 1 in which said markings define blocks for indicating areas of hair to be treated according to a selected styling technique.

5. Three-dimensional magnetic partial head form means as defined in claim 4 in which said blocks include a plurality of markings by which a plurality of styling techniques can be taught.

6. three-dimensional magnetic partial head form means as defined in claim 1 including means for attaching hair strands to be visible during use of said and hair strands.

7. A magnetic three dimensional analysis system for use as a tool in the demonstration of hairdressing techniques by an instructor and to aid cosmetology students in learning and practicing such techniques, said system comprising:
   a. three-dimensional magnetic head forms each representing a view of half a human head, said head forms each having at least one flat surface having a flat magnetic means attached for the purpose of attaching each of said head forms to a magnetically attractive flat surface;
   b. a plurality of markings on each of said magnetic head forms for indication of a hairstyling technique, said markings forming a grid to aid the student in practicing hairdressing;

c. a plurality of flat magnetic indicating means for use in connection with said head forms to demonstrate different hairstyling techniques or structures.

8. A magnetic three-dimensional analysis system as defined in claim 7 in which said system includes generally flat magnetized display means.

9. A magnetic three-dimensional analysis system as defined in claim 7 in which said indicating means are color coded to correspond to different hair structures.

10. A magnetic three-dimensional analysis system as defined in claim 7 said system including sixteen flexible magnetic indicating means.

11. A magnetic three-dimensional analysis system as defined in claim 7 said system including square, ovular, circular and triangular shaped magnetic indicating means.

* * * * *